(12) United States Patent
Schuld

(10) Patent No.: US 10,286,351 B2
(45) Date of Patent: May 14, 2019

(54) FILTER WITH FLEXIBLE SIDE SEAL

(71) Applicant: RPS Products, Inc., Hampshire, IL (US)

(72) Inventor: Daniel E. Schuld, Inverness, IL (US)

(73) Assignee: RPS Products, Inc., Hampshire, IL (US)

( * ) Notice: Subject to any disclaimer, the term of this patent is extended or adjusted under 35 U.S.C. 154(b) by 226 days.

(21) Appl. No.: 15/491,151

(22) Filed: Apr. 19, 2017

(65) Prior Publication Data

US 2018/0304187 A1    Oct. 25, 2018

(51) Int. Cl.
| | | |
|---|---|---|
| B01D 46/00 | (2006.01) | |
| B01D 46/42 | (2006.01) | |
| B01D 46/10 | (2006.01) | |
| B01D 46/52 | (2006.01) | |

(52) U.S. Cl.
CPC ..... *B01D 46/4227* (2013.01); *B01D 46/0016* (2013.01); *B01D 46/10* (2013.01); *B01D 46/521* (2013.01); *B01D 2271/027* (2013.01); *B01D 2275/203* (2013.01)

(58) Field of Classification Search
CPC ................ B01D 46/16; B01D 46/4227; B01D 46/0016; B01D 2271/027
USPC .......................... 55/422, 475, 496–499, 502
See application file for complete search history.

(56) References Cited

U.S. PATENT DOCUMENTS

| | | |
|---|---|---|
| 2,988,169 A | 6/1961 | Klein |
| 3,005,516 A | 10/1961 | Klein |
| 3,125,427 A | 3/1964 | Smith |
| 3,675,402 A | 7/1972 | Weed |
| 3,712,033 A | 1/1973 | Gronholz |
| 3,778,985 A | 12/1973 | Daigle et al. |
| 3,789,589 A | 2/1974 | Delany |
| 4,177,050 A | 12/1979 | Culbert |
| 4,373,635 A | 2/1983 | Mules |
| RE32,851 E | 1/1989 | Tarala |
| 5,013,438 A | 5/1991 | Smith |
| 5,167,740 A | 12/1992 | Michaelis et al. |
| 5,252,111 A | 10/1993 | Spencer et al. |
| 5,312,467 A | 5/1994 | Wolfe |
| 5,492,551 A | 2/1996 | Wolfe |
| 5,589,067 A | 12/1996 | Rice |
| 5,743,927 A | 4/1998 | Osendorf |
| 5,772,713 A | 6/1998 | Salinas |
| 5,779,747 A | 7/1998 | Schlor et al. |
| 5,840,094 A | 11/1998 | Osendorf |
| 5,968,217 A | 10/1999 | Stein et al. |
| 6,033,453 A | 3/2000 | Weddell, III |
| 6,110,243 A | 8/2000 | Wnenchak et al. |
| 6,126,708 A | 10/2000 | Mack et al. |

(Continued)

*Primary Examiner* — Frank M Lawrence, Jr.

(74) *Attorney, Agent, or Firm* — Greer, Burns & Crain, Ltd.

(57) ABSTRACT

A collapsible filter having a collapsed position and an expanded position includes a filter media layer having generally parallel pleat edges and a side edge perpendicular to the pleat edge. The filter also has a pair of end caps that are disposed at opposite ends of the filter media layer and are generally parallel to the pleat edges. A flexible side seal is attached to both the end caps but is not attached to the filter media layer. In an expanded position, the flexible side seal extends between the end caps and abuts against the side edge of the filter media layer.

20 Claims, 5 Drawing Sheets

(56) References Cited

U.S. PATENT DOCUMENTS

| | | |
|---|---|---|
| 6,152,980 A | 11/2000 | Culwell |
| 6,264,713 B1 | 7/2001 | Lewis, II |
| 6,485,538 B1 | 11/2002 | Toyoshima |
| 6,592,643 B2 | 7/2003 | Shah |
| 6,599,343 B2 | 7/2003 | Fredrick |
| 6,638,333 B2 | 10/2003 | Schuld |
| 6,652,613 B2 | 11/2003 | Shah |
| 6,723,150 B2 | 4/2004 | Parker |
| 6,790,261 B1 | 9/2004 | Delts |
| 6,814,773 B2 | 11/2004 | Shah |
| 7,037,354 B1 | 5/2006 | Dimicelli |
| 7,077,921 B1 | 7/2006 | Dimicelli |
| 7,452,396 B2 | 11/2008 | Terlson et al. |
| 7,497,888 B2 | 3/2009 | Ashwood et al. |
| 7,537,630 B2 | 5/2009 | Schuld et al. |
| 7,727,299 B2 | 6/2010 | Knowles |
| 8,157,881 B1 | 4/2012 | Anoszko |
| 9,114,342 B2 * | 8/2015 | Schuld .............. B01D 46/0004 |
| 2001/0022069 A1 * | 9/2001 | Fath .................. B01D 46/10 55/497 |
| 2003/0066274 A1 | 4/2003 | Fredrick et al. |
| 2003/0066275 A1 | 4/2003 | Schuld et al. |
| 2003/0066423 A1 | 4/2003 | Shah et al. |
| 2003/0066424 A1 | 4/2003 | Shah et al. |
| 2003/0066425 A1 | 4/2003 | Shah et al. |
| 2003/0070406 A1 | 4/2003 | Duffy |
| 2004/0182055 A1 | 9/2004 | Wynn |
| 2006/0053759 A1 | 3/2006 | Winters et al. |
| 2008/0034718 A1 | 2/2008 | Schuld et al. |
| 2008/0236121 A1 * | 10/2008 | Volkmer ............ B01D 46/0005 55/497 |
| 2009/0077937 A1 | 3/2009 | Privitt et al. |
| 2009/0145060 A1 | 6/2009 | Kailani et al. |
| 2009/0151312 A1 | 6/2009 | Ashwood et al. |
| 2013/0133301 A1 | 5/2013 | Sproule et al. |
| 2013/0205732 A1 * | 8/2013 | Gillilan ............. B01D 46/0001 55/497 |
| 2015/0267927 A1 | 9/2015 | Zhang et al. |
| 2016/0214046 A1 * | 7/2016 | Jursich ............... B01D 46/0005 |

\* cited by examiner

FILTER WITH FLEXIBLE SIDE SEAL

FIELD OF THE INVENTION

The present invention relates to filters, and more specifically, the present invention relates to collapsible filters with a flexible media on the sides to seal the filter with its surrounding enclosure.

BACKGROUND OF THE INVENTION

Pleated filter media, such as collapsible pleated mechanical media (ESPM) filters, occupy substantially less space in their collapsed state, compared to equivalent cartridge configurations. Thus, they are easier to store and ship, and consequently have lower storage and shipping costs. However, collapsible filters are substantially less user-friendly than equivalent cartridge-style filters, which can be easily inserted into and removed from the filter enclosure with only minimal user interaction. In contrast, collapsible filters can require assembly by the end user before they are ready to be installed into the filter housing. For example, one such air cleaner includes an inner housing forming a filter enclosure, an outer housing, and a door. Effort is required to ensure that, after installation, the filter forms an effective seal in the filter enclosure such that air must pass through the filter and not around the sides of the filter. Thus, there is a need for a collapsible filter that forms an effective seal with the filter enclosure with minimal effort by the end user.

SUMMARY OF THE INVENTION

A collapsible filter having a collapsed position and an expanded position includes a filter media layer having generally parallel pleat edges and a side edge perpendicular to the pleat edge. The filter also having a pair of end caps that are disposed at opposite ends of the filter media layer and are generally parallel to the pleat edges. A flexible side seal is attached to both the end caps but is not attached to the filter media layer. In an expanded position, the flexible side seal extends between the end caps and abuts against the side edge of the filter media layer.

In another embodiment, a pleated and collapsible filter for an air cleaner includes a filter media layer and a pair of end caps disposed at opposite ends of the filter media layer. A filter support layer extends between the pair of end caps and has first and second side edges forming a width $W_1$. The filter media layer is connected to and covers at least one side of the filter support layer such that the filter media layer has a width $W_2$, which is defined by two side edges of the filter media layer. The filter further includes a first flexible side seal and a second flexible side seal that are each attached to both of the end caps, but the first and second flexible side seals are not attached to the filter media layer. When the filter is expanded, the first flexible side seal and the second flexible side seal form a width $W_3$ that is greater than the width $W_2$.

Another filter includes a filter media layer having parallel pleat edges and two side edges that are generally perpendicular to the pleat edges. A pair of end caps are disposed at opposite ends of the filter media layer and are generally parallel with the pleat edges. A first flexible side seal is attached to both of the end caps and abuts a first side edge of the filter media layer, but is not attached to the filter media layer. A second flexible side seal is attached to both of the end caps and abuts a second side edge of the filter media layer, but is not attached to the filter media layer. The first and second flexible side seals are formed of the same material as the filter media layer.

BRIEF DESCRIPTION OF THE DRAWINGS

The drawings are merely exemplary of one or more embodiments of the present invention in which.

DETAILED DESCRIPTION OF THE INVENTION

Figure 1:
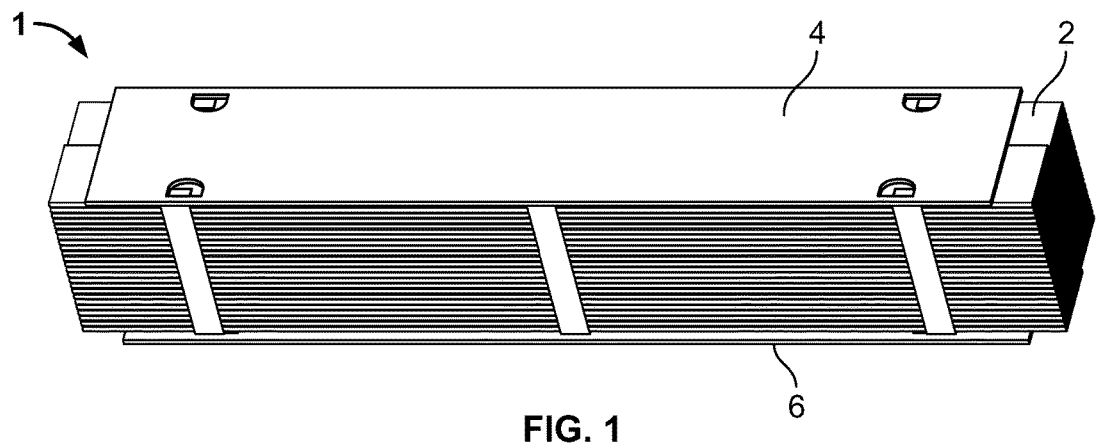
FIG. 1 is a perspective view of a prior art collapsible filter in a collapsed position.
Figure 2:
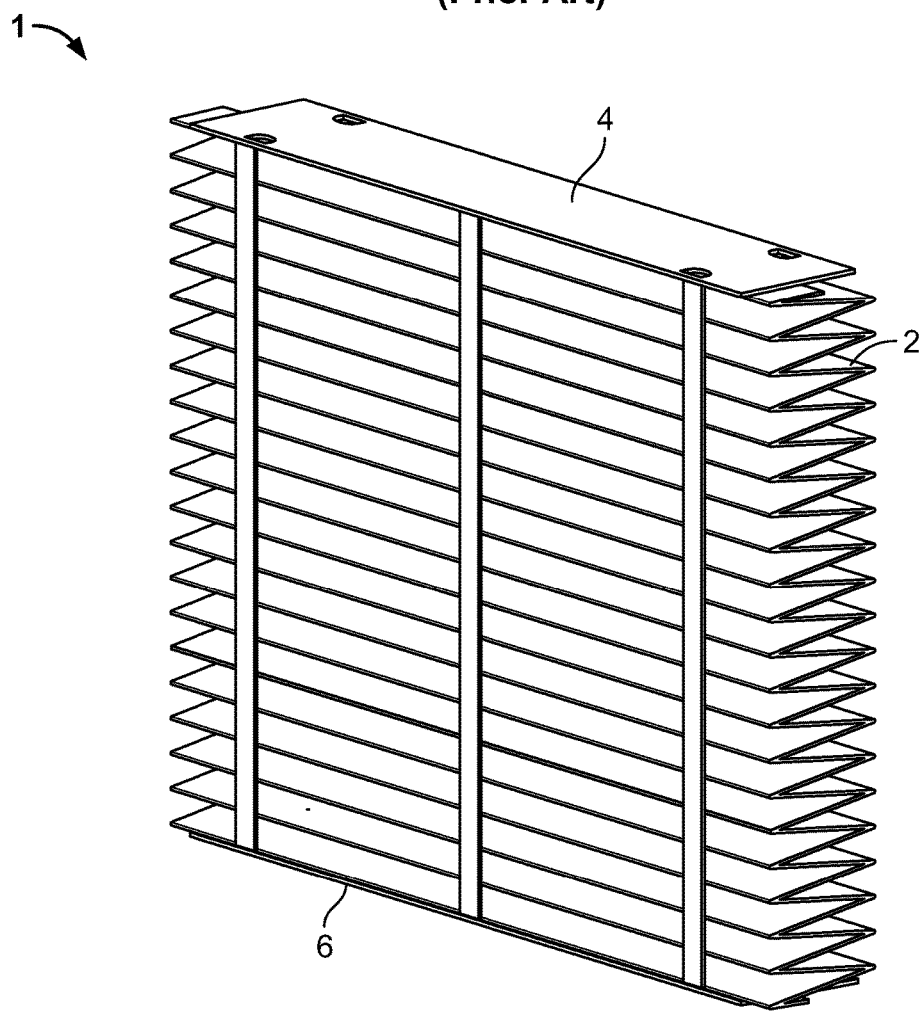
FIG. 2 is a perspective view of the prior art collapsible filter of FIG. 1 in an expanded position.

Referring to FIGS. 1-2, a prior art filter 1 is a pleated filter media such as a collapsible extended surface pleated mechanical media filter (ESPM) type. Typically, filter 1 is transported and sold in a collapsed state. At the time of installation, the filter is expanded. The filter 1 includes a filter media layer 2 and a filter support layer (not shown). The filter 1 includes a pair of end caps 4, 6 at the top and bottom ends respectively, of the filter 1. Each end cap 4, 6 is attached to the filter media layer 2, the filter support layer, or both.

Figure 3:
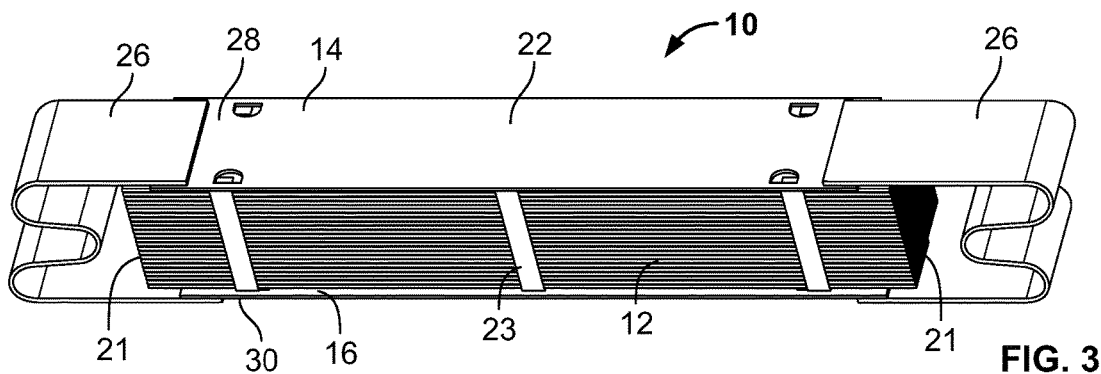
FIG. 3 is a perspective view of a collapsible filter with flexible side media in a collapsed position.
Figure 4:
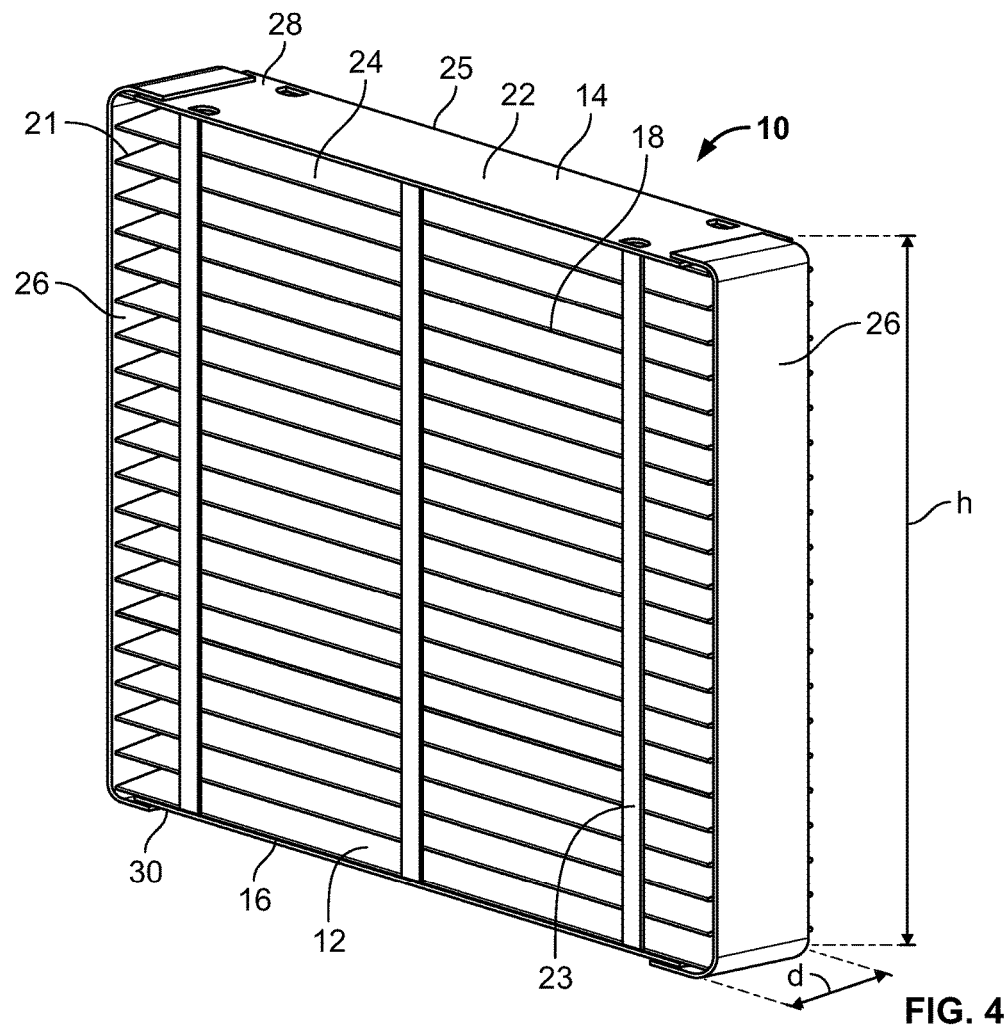
FIG. 4 is a perspective view of the collapsible filter of FIG. 3 in an expanded position.

Referring now to FIGS. 3-4, a filter 10 is preferably a pleated filter media such as a collapsible ESPM type such that the filter occupies substantially less space in its collapsed state than in its expanded state. While the following description will be directed to a collapsible ESPM type filter, it is also possible to incorporate the invention on a non-collapsible filter. The filter 10 includes a filter media layer 12 and a filter support layer 13 (shown in a non-pleated, flattened state in FIGS. 6-8). As is well known in the art, the filter media layer 12 may be made of non-woven natural or synthetic fibers capable of extracting impurities from the air. However, the filter media layer 12 can be made of other known or later-developed materials.

Figure 6:
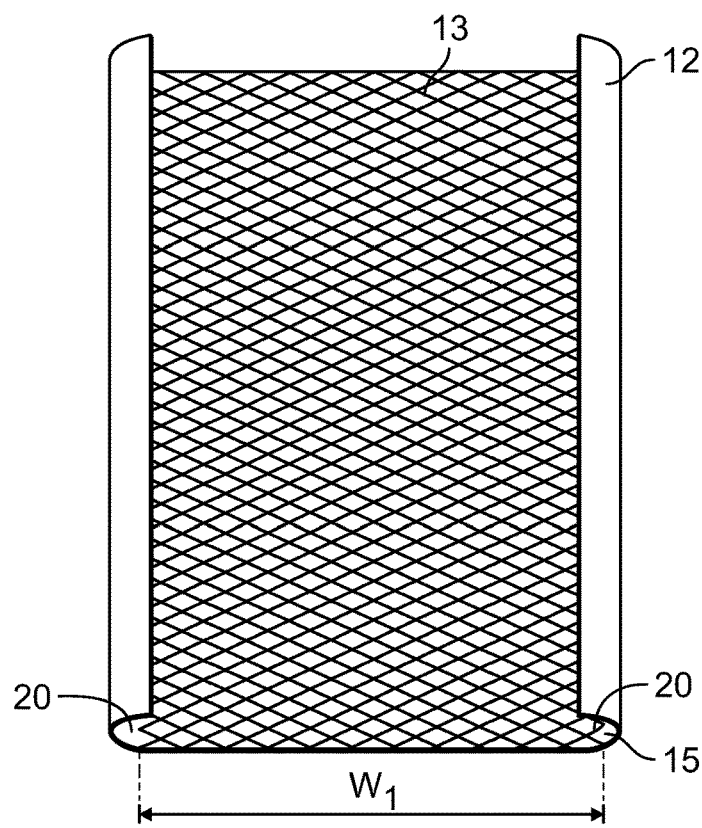
FIG. 6 is a plan view of a filter support layer and a filter media layer partially folded over the filter support layer, which is shown in a non-pleated flattened state.
Figure 7:
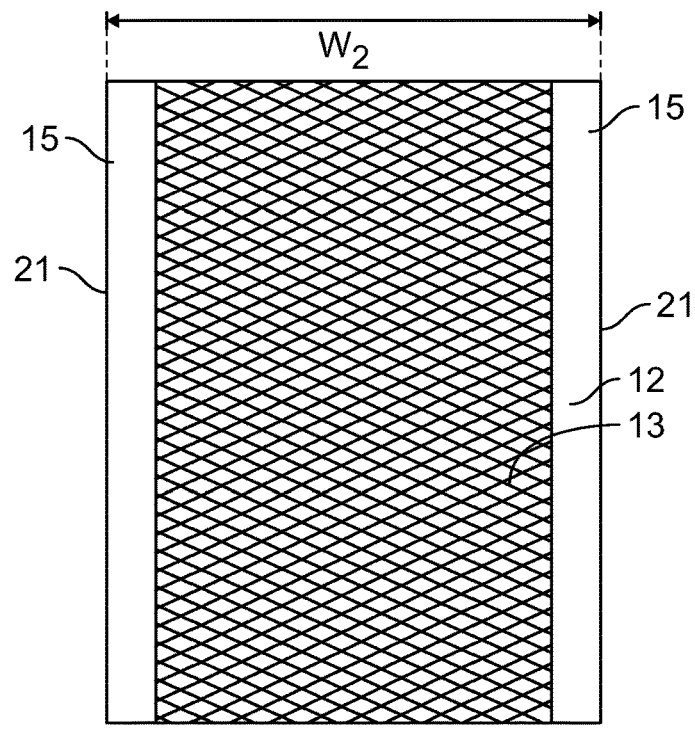
FIG. 7 is a plan view of the filter media layer folded over the filter support layer, shown in a non-pleated flattened state.

The filter support layer 13 is porous and flexible and is preferably fabricated from slit and expanded metal foil. However, the filter support layer 13 could be made of plastic or other material. The filter support layer 13 is more rigid than the filter media layer 12 and is preferably positioned on the downstream side of the filter media layer in the direction of airflow. The filter support layer 13 provides support to the filter media layer 12 to maintain a generally pleated shape of the filter 10. In the pleated shape, the filter media 12 defines generally parallel pleat edges 18. The side edges 20 of the support member 13, which are generally perpendicular to the pleat edges 18, are preferably covered with filter media 12 as shown in FIGS. 6-7 (which is shown in a non-pleated, flattened state for purposes of clarity). The side edges 21 of the filter media 12 are also generally perpendicular to the parallel pleat edges 18 in a depth direction "d".

Referring back to FIGS. 3-4, the filter 10 includes a pair of end caps 14, 16 at the top and bottom ends respectively, of the filter 10. Each end cap 14, 16 is attached to the filter media layer 12, the filter support layer 13, or both. While other configurations are contemplated, each end cap 14, 16 is preferably planar and generally elongate, with a central web 22 formed of cardboard.

The filter 10 is designed to be received in an air cleaner (not shown) having a frame enclosure. The frame enclosure includes a top wall, a bottom wall, a rear wall, and an opposite wall (typically defined by a door). The four walls define a generally rectangular air passageway in which the filter 10 is transversely positioned. Upstream of the filter 10 is the air-inlet of the passageway, and downstream of the filter 10 is the air-outlet of the passageway. The filter 10 is configured to be insertable into the frame enclosure through the door. When inserted, the filter 10 extends between the top and bottom walls, between the rear wall and the opposite wall/door, and between the air-inlet and the air-outlet of the passageway. Consequently, air can be directed to flow through an upstream surface 24 of the filter 10 and out of the downstream surface 25 of the filter 10. However, if the filter 10 does not form an effective seal with the frame enclosure, air may flow around the side edges 21 of the filter media layer 12.

As is shown in FIG. 6, the unpleated, flat filer support layer 13 is shown attached to the flat, unpleated filter media layer 12. The filter support layer 13 has a width $W_1$ measured as the distance between the side edges 20 of the filter support layer. The filter media layer 12 preferably includes portions that extend beyond the side edges 20 of the filter support layer 13. Referring to FIGS. 6-7, these portions of filter media layer 12 are preferably folded over the side edges 20 of the filter support layer 13, forming a filter media cushion 15. The filter media cushion 15 helps form an effective seal between the filter 10 and the frame enclosure. The combined filter media layer 12 and filter support layer 13 has a finished width $W_2$ measured as the distance between the side edges 21 at the filter media cushions 15, which is greater than the wide $W_1$. The configuration of the filter media cushion is more fully described in U.S. Pat. No. 9,114,342 titled "Filter with Covered Edges", which is hereby incorporated by reference.

It should be appreciated that the term "effective seal" encompasses exemplary embodiments where air flowing from the air-inlet passageway to the air-outlet passageway is directed primarily through the filter 10, rather than around it. It should be appreciated that the term "effective seal" does not necessarily mean that no air flows between around the filter media.

The filter 10 includes a flexible side seal 26 on at least one and preferably both sides 21 of the filter media layer 12. The flexible side seal 26 is preferably a ribbon formed of the same material as the filter media layer 12. The flexible side seal 26 can be formed of non-woven natural or synthetic fibers capable of extracting impurities from the air, as well as other known or later-developed materials. It is also contemplated that the material of the flexible side seal 26 can be reinforced, such as with a metal mesh, as long as the flexible side seal 26 remains flexible enough to assume a stowed position and a deployed position abutting the filter media layer 12 when the filter 10 is inserted into a frame enclosure. Carbon particles or other impregnated materials may be added to the flexible side seal 26.

The flexible side seal 26 is preferably attached at a top surface 28 of the top end cap 14, and at a bottom surface 30 of the bottom end cap 16. The flexible side seal 26 extends along the expandable height of the filter 10 at the side edges 21 (see FIGS. 3-4), but is not attached to the side edges 21 of the filter media layer 12. By not attaching the flexible side seal 26 to the side edges 21, the flexible side seal can move freely from the filter media layer 12, allowing the flexible side seal to be easily stowed in its packaging. Attachment of the flexible side seal 26 to the end caps 14, 16 may be with adhesive, by a mechanical attachment, or any other known methods.

With the flexible side seal 26, the width of the filter 10 is $W_3$ (see FIG. 8), which is greater than $W_2$. In one embodiment, each flexible side seal 26 has a width of about a 1/16 to an 1/8-inch. The width $W_3$ of the filter media layer 12 plus the two flexible side seals 26 is about the same or preferably slightly greater than the width of the enclosure so that when the filter 10 is inserted into the frame enclosure, the filter presses each flexible side seal 26 against the enclosure. The flexible side seal 26 is sandwiched between the filter media layer 12 and the enclosure to form an effective seal.

Figure 8:
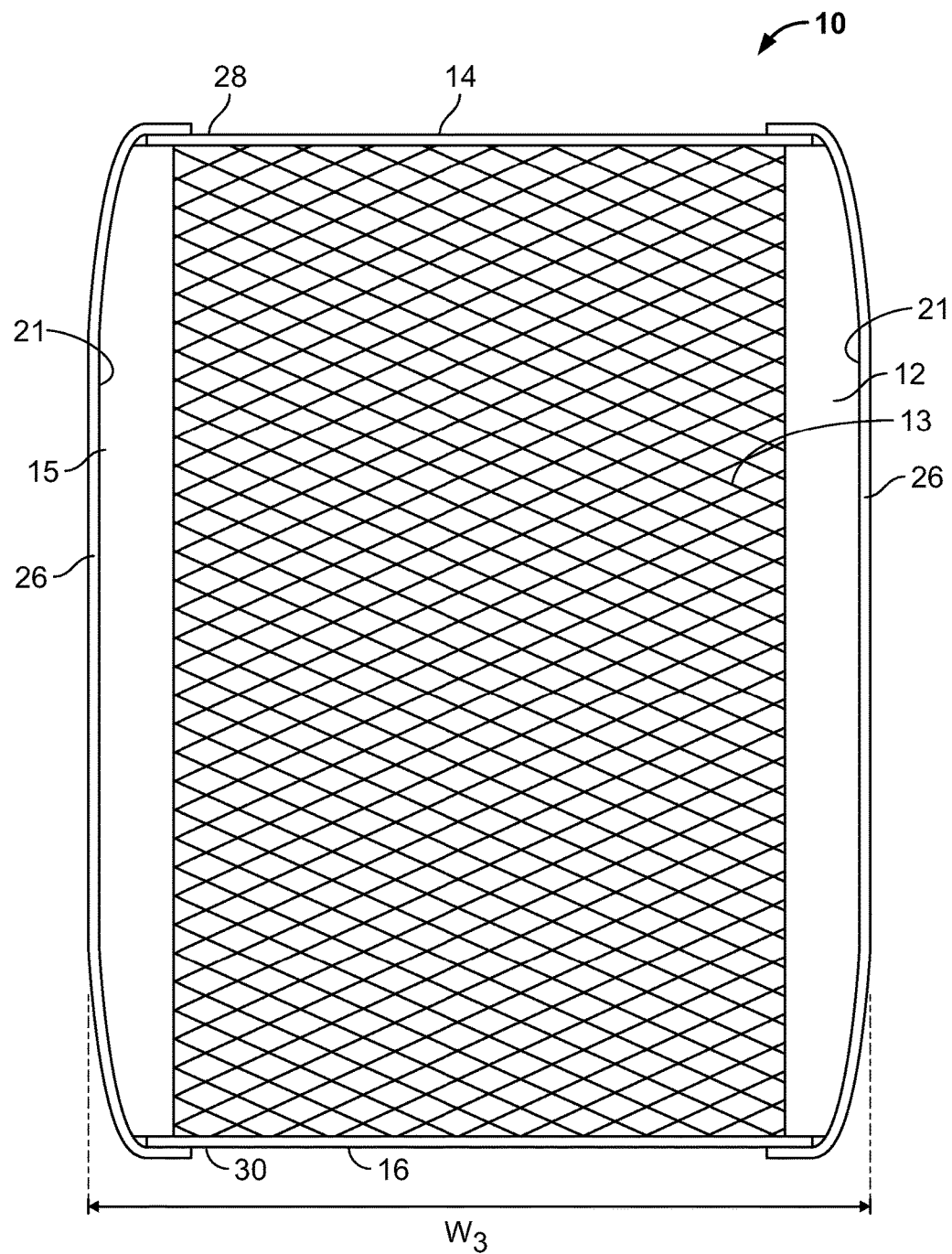
FIG. 8 is a plan view of the filter media layer and filter support layer of FIG. 7 with end caps and flexible side seals extending therebetween.

As shown in FIGS. 6-8, the filter media layer 12 is folded over the side edges 20 of the filter support layer 13, however an unfolded configuration of filter media layer 12 (where the side edges 20 are not covered to form a cushion 15) is also possible.

The flexible side seal 26 may have a depth "d" that is the generally equal to or less than the depth of the filter media layer 12. However, it is also contemplated that the flexible side seal 26 may have a depth "d" that is greater than the depth of the filter media layer 12. Further, it is contemplated that only one side 21 of the filter media layer 12 has a flexible side seal 26.

Referring back to FIGS. 3-4, the first and second flexible side seals 26 have a stowed position (FIG. 3) that corresponds to a collapsed state of the filter 10, and an extended position (FIG. 4) that corresponds to an expanded state of the filter. In the stowed position, portions of the flexible side seal 26 may be folded over and around the top surface 28 and/or the bottom surface 30 of the filter 10, while the central portion of the flexible side seal 26 extends therebetween, providing a compact packaging of the filter 10. Alternately, the flexible side seal 26 may be folded in an "accordion"-type arrangement in a stowed position. When the filter 10 is installed by the consumer, the flexible side seal 26 is deployed or unfolded so that it extends along and abuts against the expanding length of the filter at the side edge 21 of the filter media layer 12 as the filter is expanded.

The filter can optionally include one or more pleat spacer members 23 that extend between the end caps 14, 16 and are connected to the pleat surfaces 18. The spacer member 23 functions to maintain uniform and generally parallel pleat spacing and provides structural support to the filter 10. Multiple spacer members 23 can be provided on one or both sides of the filter 10.

Figure 5:
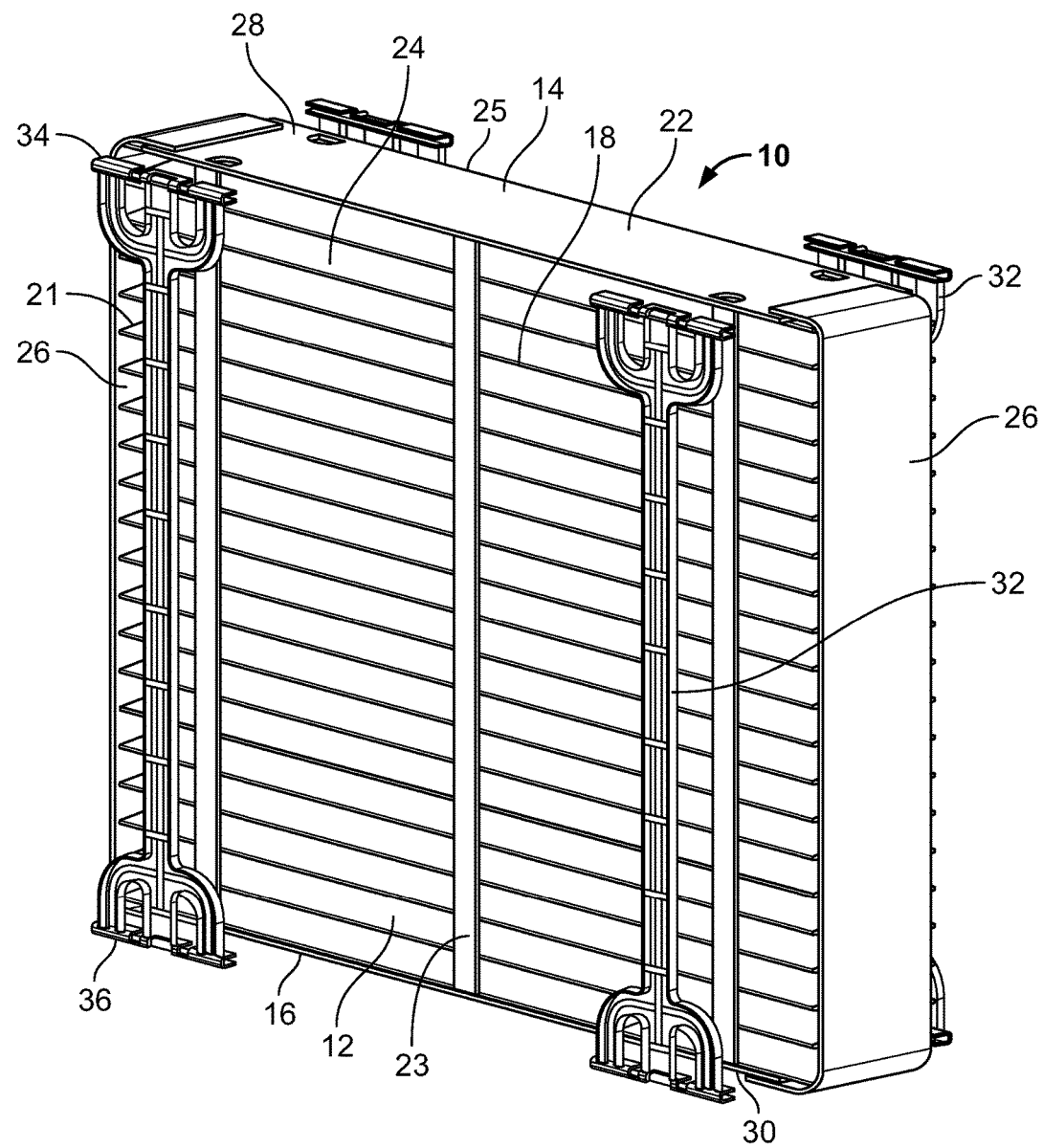
FIG. 5 is a perspective view of a second embodiment of collapsible filter in an expanded position, with an exploded view of support legs shown prior to engagement with end caps.

Referring to FIG. 5, optional legs 32 may be used to maintain the filter 10 in an expanded state. When the filter 10 is transported and sold, the filter is in a collapsed state with the legs 32 in a stowed position unengaged with the end caps 14, 16. At the time of installation, the filter 10 is expanded by displacing the end caps 14, 16 away from each other in the height "h" direction, and the legs 32 are deployed by engaging the ends 34, 36 with the end caps to support and maintain the filter in an expanded position. The configuration of the support legs is more fully described in U.S. Publication No. 2016/0214046 titled "Collapsible Filter With Support Structure", which is hereby incorporated by reference.

In the preferred embodiment, there are four legs 32 for each filter 10, arranged such that there are two legs that correspond to the upstream surface 24 of the filter, and two legs that correspond to the downstream surface 25 of the filter. The first end 34 of each leg 32 engages the top surface 28 of the top end cap 14, and the second end 36 of each leg engages the bottom surface 30 of the bottom end cap 16.

While particular embodiments of the collapsible filter 10 with a flexible side seal 26 have been shown and described, it will be appreciated by those skilled in the art that changes and modifications may be made thereto without departing from the invention in its broader aspects and as set forth in the following claims.

What is claimed is:

1. A collapsible filter having a collapsed position and an expanded position, comprising:
   a filter media layer having generally parallel pleat edges and at least one side edge perpendicular to the pleat edges;
   a pair of end caps disposed at opposite ends of the filter media layer and generally parallel to the pleat edges; and
   at least one flexible side seal attached to the pair of end caps but free from attachment to the filter media layer, wherein in the expanded position, the flexible side seal extends between the end caps and abuts against the side edge of the filter media layer.

2. The collapsible filter of claim 1, wherein the at least one side edge comprises two side edges, and the at least one flexible side seal comprises two flexible side seals, and wherein in the expanded position, the two flexible side seals each extend between the end caps, and each flexible side seal is engaged against one of the two side edges of the filter media layer.

3. The collapsible filter of claim 1 wherein the flexible side seal is comprised of the same material as the filter media layer.

4. The collapsible filter of claim 3 wherein the flexible side seal and the filter media layer are both formed of non-woven natural or synthetic fibers capable of extracting impurities from the air.

5. The collapsible filter of claim 1 wherein the flexible side seal has a width of between $1/16$-inch and $1/8$-inch.

6. The collapsible filter of claim 1 further comprising a filter support layer having a width $W_1$, wherein the filter media layer is folded over the filter support layer forming a filter media cushion.

7. The collapsible filter of claim 6 wherein the width of the filter support layer and the media cushion is a width $W_2$, which is greater than $W_1$.

8. The collapsible filter of claim 7 wherein the width of the filter support layer, the media cushion and the flexible side seal is a width $W_3$, which is greater than $W_2$.

9. The collapsible filter of claim 1 further comprising at least one leg that has a deployed position extending generally the height of the filter between the pair of end caps when the collapsible filter is in the expanded position.

10. A collapsible filter having a collapsed position and an expanded position, comprising:
    a filter media layer;
    a pair of end caps disposed at opposite ends of the filter media layer;
    a filter support layer extending between the pair of end caps and having first and second side edges forming a width $W_1$, the filter media layer connected to and covering at least one side of the filter support layer such that the filter media layer has a width $W_2$ defined between two side edges of the filter media layer; and
    a first flexible side seal and a second flexible side seal are each attached to the pair of end caps but are both free from attachment to the filter media layer, wherein when the filter is expanded, the first flexible side seal and the second flexible side seal form a width $W_3$ greater than the width $W_2$.

11. The collapsible filter of claim 10 wherein the first and second flexible side seals are comprised of the same material as the filter media layer.

12. The collapsible filter of claim 11 wherein the first and second flexible side seals and the filter media layer are both formed of non-woven natural or synthetic fibers capable of extracting impurities from the air.

13. The collapsible filter of claim 10 wherein each of the first and second flexible side seals has a width of between $1/16$-inch and $1/8$-inch.

14. The collapsible filter of claim 10 further comprising at least one leg that has a deployed position extending generally the height of the filter between the pair of end caps when the collapsible filter is in the expanded position.

15. The collapsible filter of claim 14 wherein the at least one leg comprises four legs.

16. The collapsible filter of claim 15 wherein two of the four legs engage the pair of end caps at an upstream surface of the filter, and wherein another two of the four legs engage the pair of end caps at a downstream surface of the filter.

17. The collapsible filter of claim 10 wherein the filter media layer has generally parallel pleat edges, and the first flexible side seal and the second flexible side seal abut the side edges of the flexible media layer generally perpendicularly to the pleat edges when the filter is expanded.

18. A filter comprising:
    a filter media layer having generally parallel pleat edges and two side edges that are generally perpendicular to the parallel pleat edges;
    a pair of end caps disposed at opposite ends of the filter media layer and generally parallel with the pleat edges;
    a first flexible side seal is attached to the pair of end caps and abuts a first of the two side edges of the filter media layer, but is not attached to the filter media layer; and
    a second side seal is attached to the pair of end caps and abuts a second of the two side edges of the filter media layer, but is not attached to the filter media layer;
    wherein the first and second flexible side seals are formed of the same material as the filter media layer.

19. The filter of claim 18 wherein the filter is collapsible.

20. The filter of claim 18 further comprising a filter support layer extending between the pair of end caps, wherein the filter media layer is folded over the filter support layer defining the two side edges.

* * * * *